United States Patent [19]
Shoji

[11] Patent Number: 5,396,107
[45] Date of Patent: Mar. 7, 1995

[54] POWER SOURCE SYSTEM
[75] Inventor: Junichi Shoji, Ibaraki, Japan
[73] Assignee: Hitachi, Ltd., Tokyo, Japan
[21] Appl. No.: 975,529
[22] Filed: Nov. 12, 1992
[30] Foreign Application Priority Data
Nov. 18, 1991 [JP] Japan .................. 3-328399
[51] Int. Cl.⁶ .............................. H02J 3/00
[52] U.S. Cl. ...................... 307/134; 307/139
[58] Field of Search .................. 307/38–41, 307/113–115, 134, 139, 140; 358/190; 348/730

[56] References Cited
U.S. PATENT DOCUMENTS

| | | | |
|---|---|---|---|
| 4,437,018 | 3/1984 | Manley | 307/38 |
| 4,575,640 | 3/1986 | Martin | 307/23 |
| 5,003,192 | 3/1991 | Beigel | 307/140 |
| 5,099,157 | 3/1992 | Meyer | 307/632 |
| 5,120,983 | 6/1992 | Sämann | 307/38 |

Primary Examiner—A. D. Pellinen
Assistant Examiner—Fritz M. Fleming
Attorney, Agent, or Firm—Fay, Sharpe, Beall, Fagan, Minnich & McKee

[57] ABSTRACT

A power source system failing to become operable when only a primary A.C. power source is turned on, and made operable by turning on not only the primary A.C. power source but also a secondary power source is disclosed, in which initial-state-of-secondary-source setting means is previously set so that the initial state of the secondary power source at a time when the primary A.C. power source is turned on, is a desired one of an ON-state and an OFF-state, a system control part reads out the state of the initial-state-of-secondary-source setting means immediately after the primary A.C. power source has been turned on, and an ON-OFF control is performed for an ON/OFF switching circuit in accordance with the read-out state, to make the initial state of the secondary power source equal to the desired state. Thus, in a case where a controlled apparatus is required to become operable as soon as the primary A.C. power source is turned on, the initial-state-of-secondary-source setting means is set so that the initial state of the ON/OFF switching circuit is an ON-state, to make the controlled apparatus usable immediately without operating any operation switch, thereby improving the usability of the controlled apparatus.

3 Claims, 4 Drawing Sheets

POWER SOURCE SYSTEM

BACKGROUND OF THE INVENTION

The present invention relates to a power source system which includes not only a primary power source but also a secondary power source, and more particularly to a power source system used for an apparatus which does not become operable when only a primary A.C. power source is turned on, but is made operable by turning on a secondary power source after the primary A.C. power source has been turned on, for example, a video printer.

In a power source system for an apparatus which is high in frequency of use, it is desirable to keep the secondary power source at an ON-state after the primary A.C. power source has been turned on. While, in a power source system for an apparatus which is low in frequency of use, it is desirable that the secondary power source is usually turned off, but turned on each time the apparatus is operated, because power consumption is reduced. The present invention relates to a power source system which can perform two kinds of operations mentioned above.

FIG. 1 is a block diagram showing a power source system according to a prior art. The power source system of FIG. 1 is used for a video printer which is a controlled apparatus. In FIG. 1, reference numeral 1 designates a power source part, 1a an A.C. input part, 2 a firm-output power circuit, 3 an ON/OFF switching circuit, 3a the movable contact of the switching circuit 3, 4 a system control microcomputer used as a system control part, 5 a first operation switch of the non-lock type, and 6 a controlled circuit (for example, a video printer provided with a memory).

Next, the circuit operation of the power source system of FIG. 1 will be explained.

When an A.C. voltage is supplied from the A.C. input part 1a to the power source part 1, a secondary voltage is applied to the firm-output power circuit 2 and the ON/OFF switching circuit 3, and a stablized voltage is delivered from the firm-output power circuit 2. The stabilized voltage from the power circuit 2 is applied to the system control microcomputer 4 connected to the output side of the power circuit 2. Thus, the system control microcomputer 4 begins to operate.

The ON/OFF switching circuit 3 is previously set so that the initial state of the switching circuit 3 at this time is an OFF-state. Thereafter, the operation switch 5 is depressed. On detecting the operation output of the switch 5, the system control microcomputer 4 delivers a source control signal 7, to put the movable contact 3a in contact with a predetermined, fixed contact, thereby turning on the ON/OFF switching circuit 3. As a result, the secondary voltage is applied to the controlled circuit 6. Thus, the video printer which is the controlled circuit 6, can perform a printing operation with the aid of a switch (not shown).

When it is desired to put the ON/OFF switching circuit 3 back to the OFF-state, the operation switch is again depressed. On receiving the operation output of the switch 5, the system control microcomputer 4 delivers the source control signal 7, to turn off the ON/OFF switching circuit 3 again.

An example of the video printer using such a technique is described in, for example, the September 1989 issue of a Japanese magazine "Television Technology".

As has been explained with reference to FIG. 1, in the above-mentioned prior art, the initial state of the ON/OFF switching circuit 3 (for delivering the secondary voltage) at a time when the A.C. voltage (that is, primary voltage) is supplied, is required to be the OFF-state. Hence, even in a case where the controlled circuit (for example, video printer) is required to become usable immediately after the primary voltage has been supplied, it is necessary to depress the operation switch for the purpose of turning on the ON/OFF switching circuit. Thus, there arises a problem that the controlled circuit is bad in operability and poor in usability.

SUMMARY OF THE INVENTION

It is a main object of the present invention to provide a power source system which can solve the above problem of the prior art, which can be previously set so that the initial state of an ON/OFF switching circuit (for delivering a secondary voltage) at a time when an A.C. voltage (that is, primary voltage) is supplied, is a desired one of an OFF-state and an ON-state, and which can be previously set so that the initial state of the ON/OFF switching circuit is the ON-state, for a case where an apparatus supplied with electric power from the power source system is required to become usable immediately after the primary voltage has been supplied, to make the apparatus operable without operating any operation switch, thereby improving the usability of the apparatus.

It is another object of the present invention to provide a power source system, in which the initial state of a secondary power source serving as an operation source for supplying electric power to a controlled apparatus, can be readily set to a desired one of an ON-state and an OFF-state.

In order to attain the above objects, a power source system according to the present invention includes initial-state-of-ON/OFF-switch setting means which is used as initial-state-of-secondary-source setting means for previously indicating that the initial state of an ON/OFF switching circuit at a time when an A.C. power source on the primary side is changed from an OFF-state to an ON-state (that is, the A.C. power source is turned on), is a desired one of an ON-state and an OFF-state, and for realizing that the initial state of the switching circuit is the desired state.

In more detail, in a case where the initial-state-of-ON/OFF-switch setting means is set so that the initial state of the ON/OFF switching circuit is the ON-state, when the A.C. power source on the primary side is turned on, the ON/OFF switching circuit for delivering the output of a secondary power source to a desired apparatus (for example, video printer) is automatically turned on. Thus, the apparatus becomes usable as soon as the A.C. power source on the primary side is turned on. While, in a case where the initial-state-of-ON/OFF-switch setting means is set so that the initial state of the ON/OFF switching circuit is the OFF-state, when the A.C. power source on the primary side is turned on, the ON/OFF switching circuit for delivering the output of the secondary power source to the apparatus is turned off. In other words, a power source system according to the present invention is used properly in accordance with the apparatus used. Thus, the usability of the apparatus is improved.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

A power source system according to the present invention will be explained below, with reference to the drawings.

Figure 1:
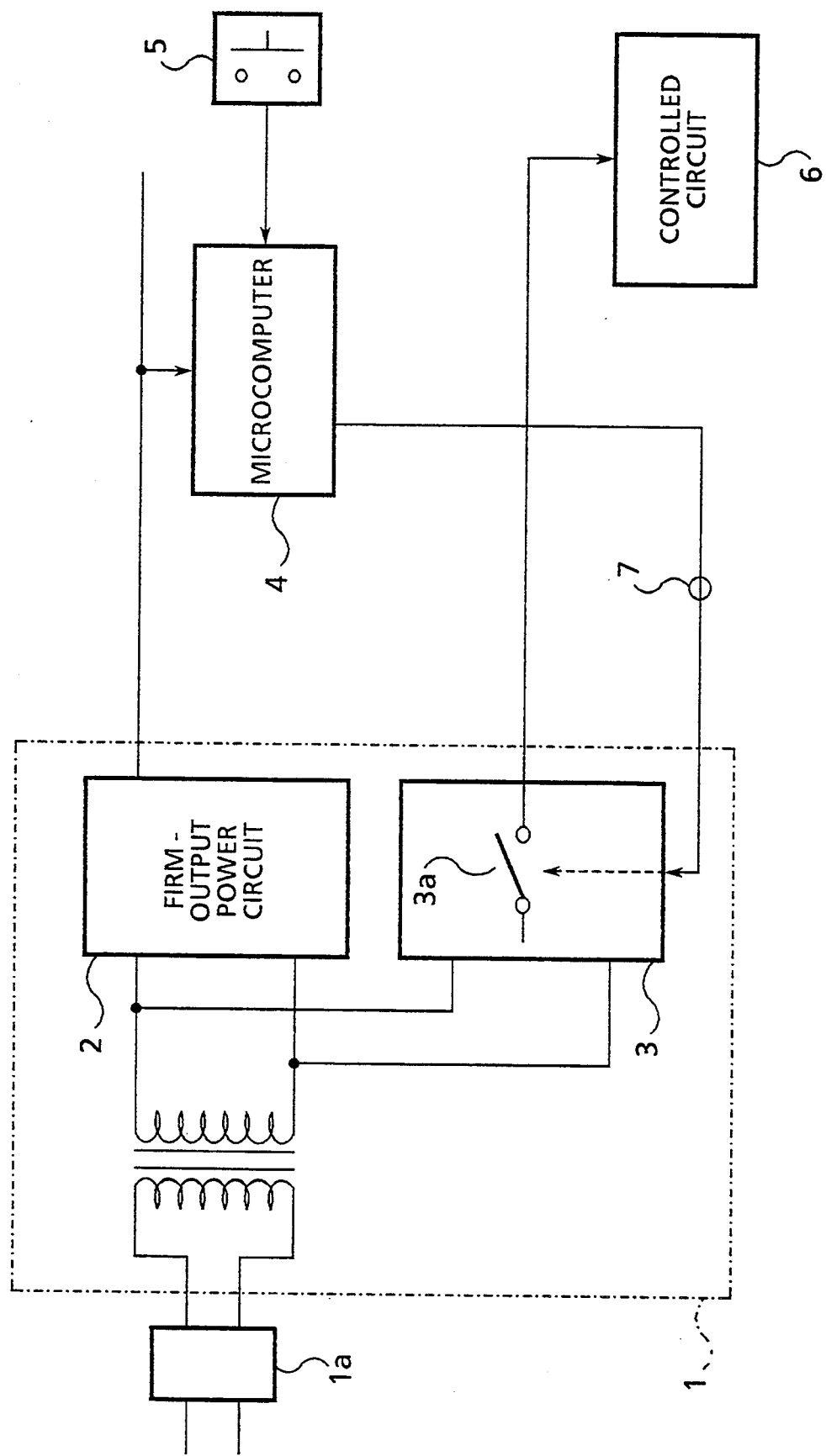
FIG. 1 is a block diagram showing a power source system according to a prior art.
Figure 2:
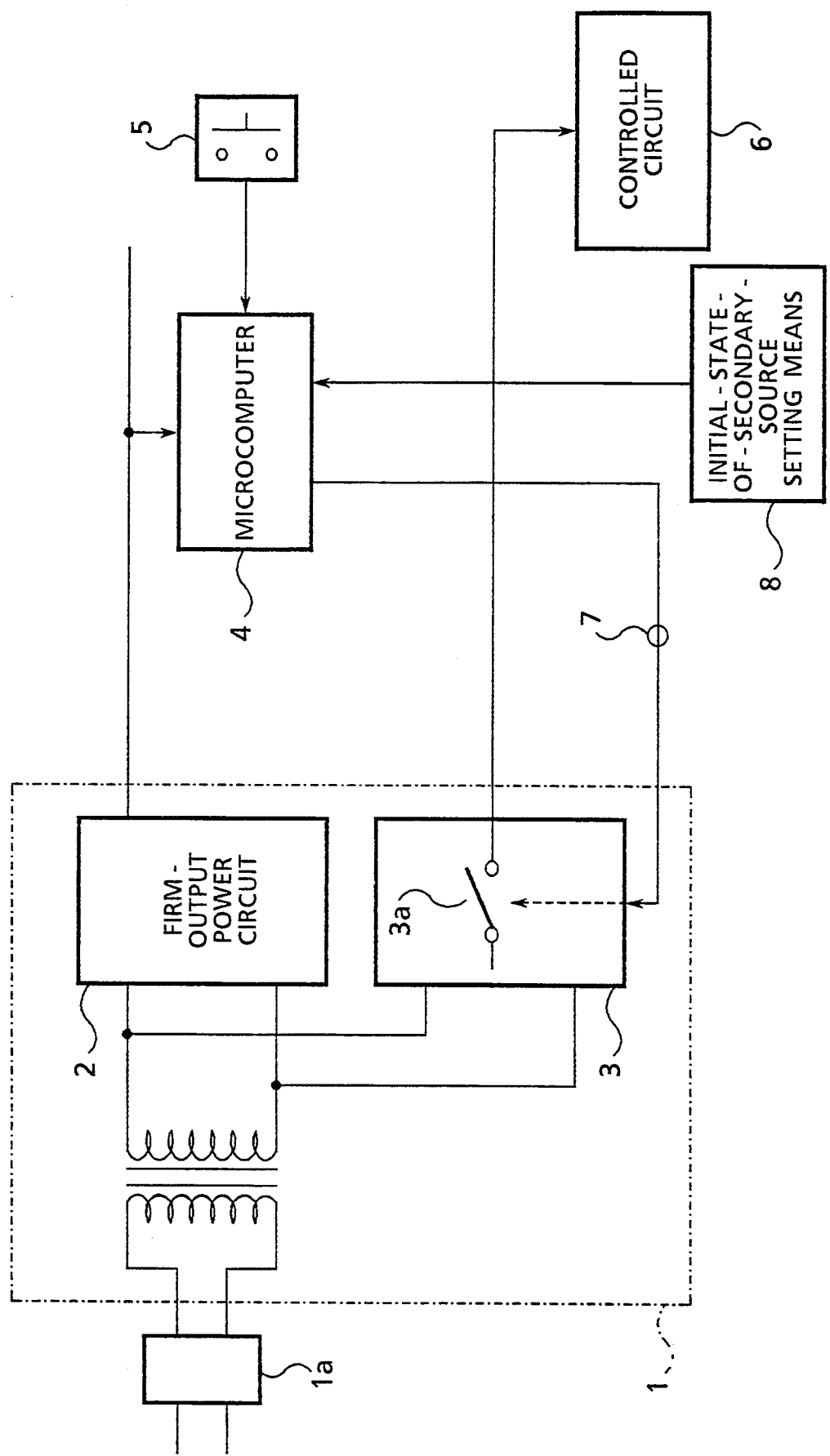
FIG. 2 is a block diagram showing the first embodiment of a power source system according to the present invention.

FIG. 2 is a block diagram showing the first embodiment of a power source system according to the present invention. In FIGS. 1 and 2, the same reference numerals designate like parts. That is, in FIG. 2, reference numeral 1 designates the power source part, 1a the A.C. input part, 2 the firm-output power circuit, 3 the ON/OFF switching circuit, 3a the movable contact of the switching circuit 3, 4 the system control microcomputer, 5 the first operation switch of the non-lock type, 6 the controlled circuit, and 8 initial-state-of-secondary-source setting means.

Referring to FIG. 2, when an A.C. voltage is supplied from the A.C. input part 1a to the power source part 1, a secondary voltage is applied to the firm-output power circuit 2 and the ON/OFF switching circuit 3, and a stabilized voltage is delivered from the firm-output power circuit 2. The stabilized voltage from the firm-output power circuit 2 is applied to the system control microcomputer 4. Thus, the system control microcomputer 4 begins to operate. On becoming operable, the system control microcomputer 4 detects and takes in the state of the initial-state-of-secondary-source setting means 8. A user can set the setting means 8 so that the initial state of the switching circuit 3 is a desired one of an OFF-state and an ON-state, from the outside of the power source system.

Let us consider a case where the initial-state-of-secondary-source setting means 8 is set by the user so that the initial state of the switching circuit 3 is the OFF-state. On becoming operable, the system control microcomputer 4 detects and takes in the state of the setting means 8, and delivers the source control signal 7 to the ON/OFF switching circuit 3, to put the movable contact 3a of the switching circuit 3 to an OFF-state. Thus, the secondary voltage which is to be applied to the controlled circuit 6 through the switching circuit 3, is cut off.

Thereafter, the operation switch 5 is depressed a plurality of times. Each time the system control microcomputer 4 detects the operation output of the switch 5, the microcomputer 4 changes the source control signal 7, and thus the operating state of the ON/OFF switching circuit 3 is changed from the OFF-state to the ON-state, or from the ON-state to the OFF-state.

Further, let us consider a case where the initial-state-of-secondary-source setting means 8 is set by the user so that the initial state of the switching circuit 3 is the ON-state. On becoming operable, the system control microcomputer 4 detects and takes in the state of the setting means 8, and delivers the source control signal 7 to the ON/OFF switching circuit 3, to turn on the switching circuit 3. Thus, the secondary voltage is applied to the controlled circuit 6 through the switching circuit 3.

Thereafter, the first operation switch 5 is depressed a plurality of times. Each time the system control microcomputer 4 detects the operation output of the switch 5, the microcomputer 4 changes the source control signal 7, and thus the operating state of the ON/OFF switching circuit 3 is changed from the ON-state to the OFF-state, or from the OFF-state to the ON-state.

As mentioned above, according to the present embodiment, the initial state of a secondary power source which serves as an operation source for supplying electric power to a controlled apparatus (for example, video printer), that is, the state of the secondary power source at a time when an A.C. power source (that is, primary power source) has been just turned on, can be set to a desired one of the ON-state and the OFF-state. Thus, the usability of the controlled circuit 6 is improved.

Figure 3:
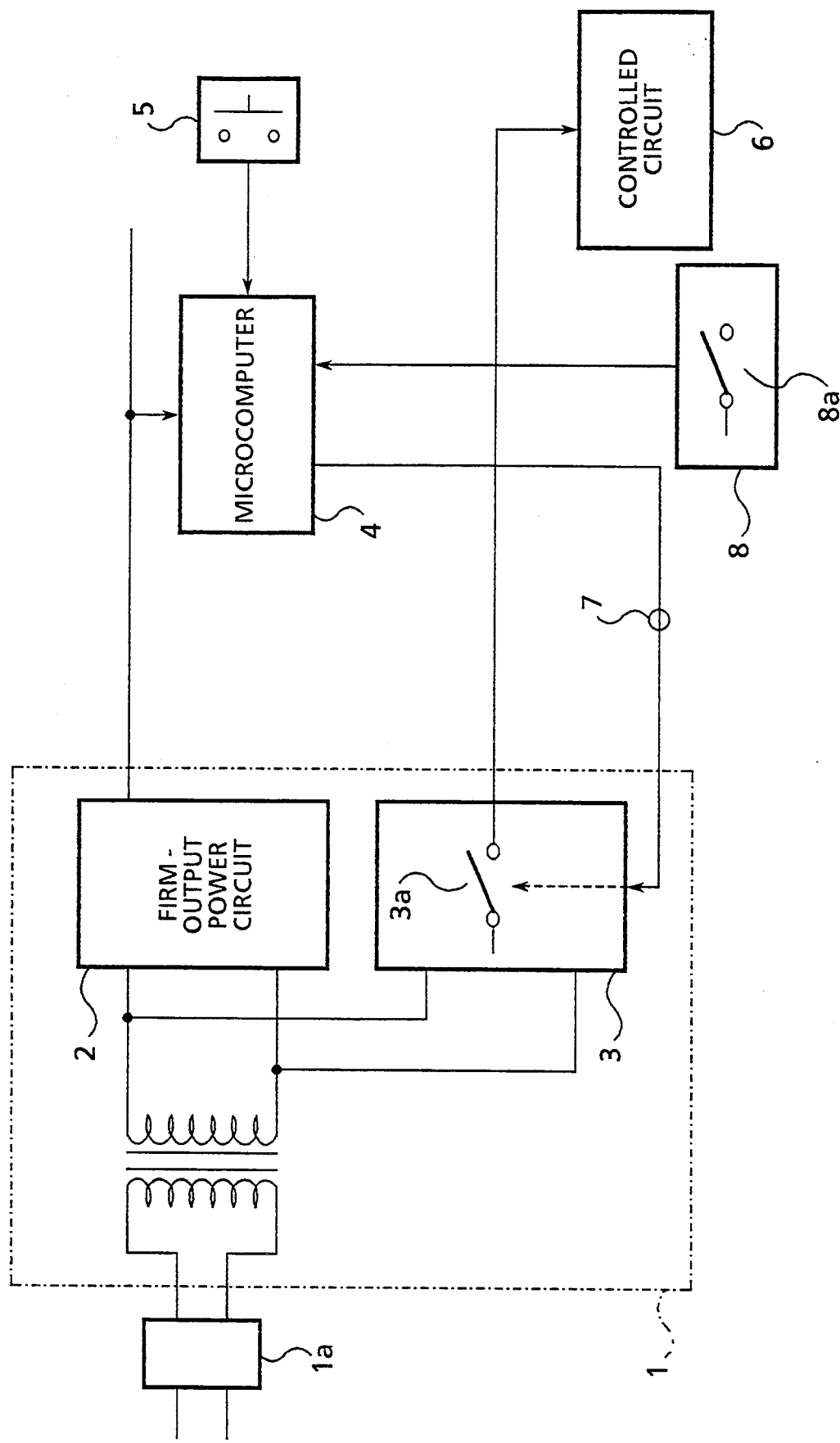
FIG. 3 is a block diagram showing the second embodiment of a power source system according to the present invention.

FIG. 3 is a block diagram showing the second embodiment of a power source system according to the present invention. In FIGS. 1 and 3, the same reference numerals designate like parts.

Referring to FIG. 3, the secondary-source setting means 8 is formed of a mechanical switch 8a. The mechanical switch 8a means a switch capable of maintaining the operating state thereof mechanically, and includes a slide switch, a toggle switch, a push-lock switch, and others. Thus, the initial state of the switching circuit 3 can be set to the ON-state or the OFF-state, according to whether the movable contact of the mechanical switch is kept at a closed state or open state.

Figure 4:
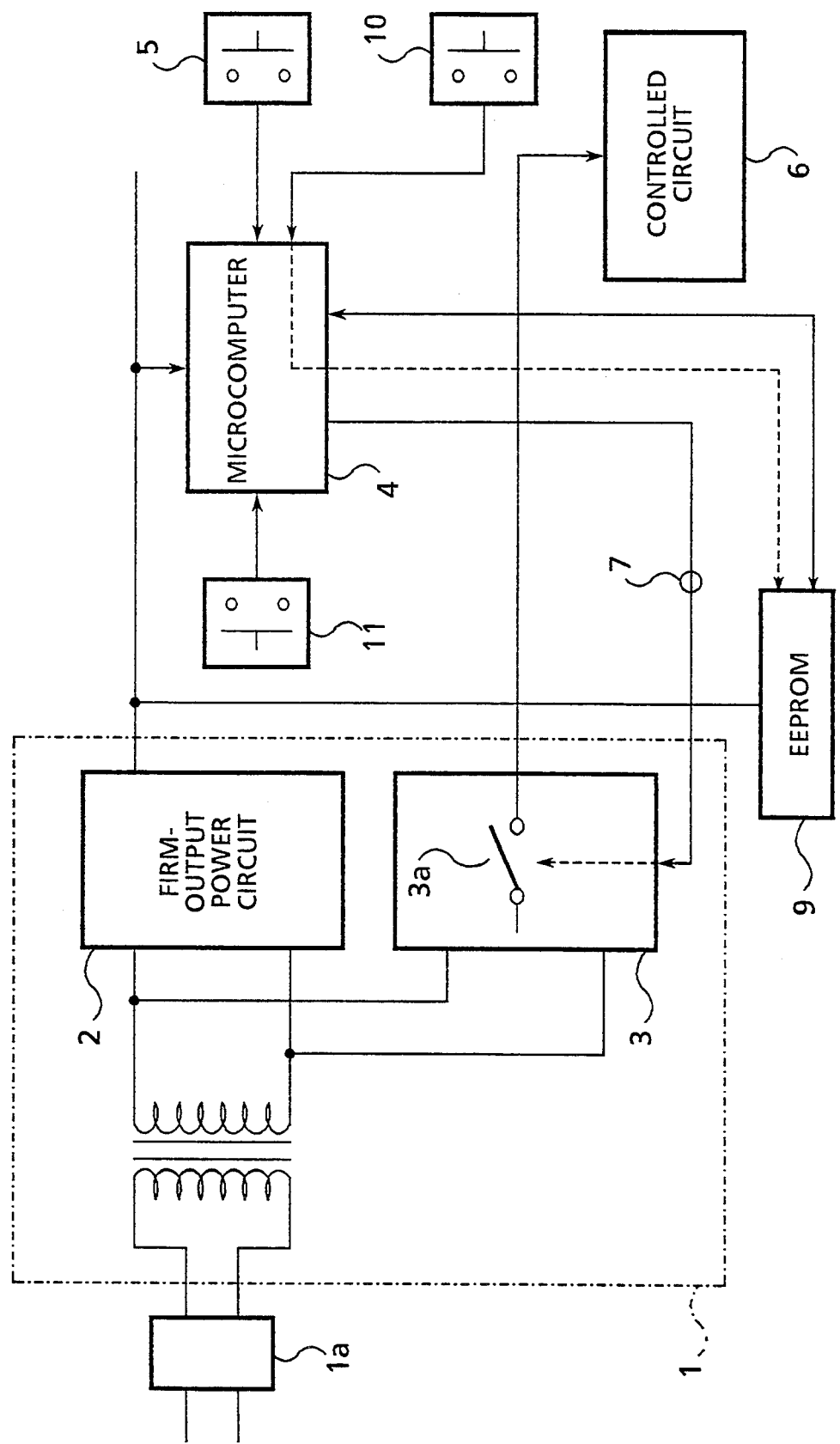
FIG. 4 is a block diagram showing the third embodiment of a power source system according to the present invention.

FIG. 4 is a block diagram showing the third embodiment of a power source system according to the present invention. In FIGS. 1 and 4, the same reference numerals designate like parts. In the present embodiment, the initial-state-of-secondary-source setting means is formed of an electrically erasable programmable read only memory (hereinafter referred to as "EEPROM"), and others.

In FIG. 4, reference numeral 9 designates an EEPROM, 10 a second operation switch which is different from the first operation switch 5 for operating the switching circuit 3, and 11 an EEPROM initializing switch. Like the system control microcomputer 4, the EEPROM 9 is supplied with electric power from the firm-output power circuit 2.

Immediately after an A.C. power source (that is, primary power source) has been turned on, the system control microcomputer 4 takes in the contents of the EEPROM 9. The contents of the EEPROM 9 are previously set so that the initial state of the switching circuit is a desired one of an ON-state and an OFF-state.

The EEPROM initializing switch 11 is disposed within the power source system. Hence, at a time when the present embodiment is used, the switch 11 cannot be operated. In the manufacturing process at a factory or the like, the EEPROM 9 is controlled by operating the EEPROM initializing switch 11 so that the contents of the EEPROM corresponds to the OFF-state of the switching circuit 3 indicative of the initial state thereof.

Thus, the contents of the EEPROM 9 are prevented from being indefinite.

Next, in a case where the present embodiment is used, the second operation switch 10 different from the first operation switch 5 is operated to control the EEPROM 9 through the dotted line of FIG. 4 so that the contents of the EEPROM 9 correspond to the initial state of the ON/OFF switching circuit 3 which is selected from the ON-state and the OFF-state.

In FIG. 4, a switch which is used only for making the contents of the EEPROM 9 correspond to the initial state of the ON/OFF switching circuit 3, is used as the second operation switch 10. Alternatively, a switch for operating a different apparatus may be used as the second operation switch 10. In this case, the switch is operated in accordance with a predetermined procedure so that the EEPROM 9 has desired contents. As described above, the initial-state-of-secondary-source setting means can be formed by using the EEPROM. It is needless to say that this initial-state-of-secondary-source setting means can perform the same operation as the operation of the setting means 8 of FIG. 2.

Next, an example of the application of a power source system according to the present invention will be explained. Let us consider a system which is used as a controlled apparatus (that is, the controlled circuit 6) and includes a video printer, a video camera, a video monitor and a personal computer for producing an ID card (namely, identification card) or a breast mark (namely, nameplate attached to the breast).

In the ID card (or breast mark) production system, an image of the face of a person is obtained by the video camera, and the image is stored in the memory of the video printer. Next, the image is read out from the memory, to be monitored by the video monitor. Then, a simple editing operation is performed on the monitoring screen. That is, in addition to the image, characters are displayed on the monitoring screen with the aid of the personal computer, and the arrangement of characters is corrected. When the arrangement on the monitoring screen is judged to be satisfactory, the image and characters are printed by the video printer, to produce the ID card or breast mark.

In order to operate such a production system, a main switch is provided for an A.C. power source on the primary side, and the whole of the production system is supplied with electric power from a secondary power source. According to the prior art, it is impossible to turn on the secondary power source at the same time as the main switch is closed. While, in a power source system according to the present invention, the secondary power source can be turned on at the same time as the main switch is closed. Thus, this power source system improves the operability of the production system.

As has been explained in the foregoing, according to the present invention, the initial state of a secondary power source at a time when an A.C. power source (that is, primary power source) is turned on, can be set to a desired one of an ON-state and an OFF-state. Thus, when a user applies a power source system according to the present invention to a system made up of a video printer and peripheral devices such as a video monitor, the usability of the system is greatly improved.

I claim:

1. A power source system comprising:
    a firm-output power circuit for outputting a stabilized voltage continually to components located on a secondary side when an A.C. voltage is applied to a primary side;
    an ON/OFF switching circuit for controlling an application of a voltage to a controlled apparatus in response to a source control signal, said controlled apparatus comprising a circuit having a main function which is not turned on when the A.C. voltage is applied to the primary side;
    a first non-lock type operation switch for designating a change of state of the ON/OFF switching circuit;
    a system control part operated by the stabilized output voltage of the firm-output power circuit for selecting an operating state by delivering the source control signal to the ON/OFF switching circuit in response to each operation output of the first non-lock type operation switch to change the operating state of the ON/OFF switching circuit from an OFF-state, to an ON-state, or from the ON-state to the OFF-state to control the application of the voltage to the controllable apparatus; and
    initial-state-of-secondary-source setting means for instructing the system control part to set an initial state of the ON/OFF switching circuit, when the A.C. voltage is applied to the primary side of the firm-output power circuit, the initial-state-of-secondary-source setting means setting the initial state, independent of the previous operating state, to a desired one of the ON-state and the OFF-state.

2. A power source system comprising;
    a firm-output power circuit for outputting a stabilized voltage continually to components located on a secondary side when an A.C. voltage is applied to a primary side;
    an ON/OFF switching circuit for controlling an application of a voltage to a controlled apparatus in response to a source control signal, said controlled apparatus comprising a circuit having a main function which is not turned on when the A.C. voltage is applied to the primary side:
    a first non-lock type operation switch for designating a change of state of the ON/OFF switching circuit;
    a system control part operated by the stabilized output voltage of the firm-output power circuit for selecting an operating state by delivering the source control signal to the ON/OFF switching circuit in response to each operation output of the first non-lock type operation switch to change the operating state of the ON/OFF switching circuit from an OFF-state, to an ON-state, or from the ON-state to the OFF-state to control the application of the voltage to the controllable apparatus; and;
    initial-state-of-secondary-source setting means for instructing the system control part to set an initial state of the ON/OFF switching circuit, when the A.C. voltage is applied to the primary side of the firm-output power circuit, the initial-state-of-secondary-source setting means including a mechanical switch, the mechanical switch setting the initial state, independent of the previous operating state, to a desired one of the ON-state and the OFF-state.

3. A power source system comprising:
    a firm-output power circuit for outputting a stabilized voltage continually to components located on a secondary side when an A.C. voltage is applied to a primary side;

an ON/OFF switching circuit for controlling an application of a voltage to a controlled apparatus in response to a source control signal, said controlled apparatus comprising a circuit having a main function which is not turned on when the A.C. voltage is applied to the primary side;

a first non-lock type operation switch for designating a change of state of the ON/OFF switching circuit;

a system control part operated by the stabilized output voltage of the firm-output power circuit for selecting an operating state by delivering the source control signal to the ON/OFF switching circuit in response to each operation output of the first non-lock type operation switch to change the operating state of the ON/OFF switching circuit from an OFF-state, to an ON-state, or from the ON-state to the OFF-state to control the application of the voltage to the controllable apparatus; and initial-state-of-secondary-source setting means for instructing the system control part to set a desired initial state of the ON/OFF switching circuit, when the A.C. voltage is applied to the primary side of the firm-output power circuit, the initial-state-of-secondary-source setting means setting the desired initial state, independent of the previous operating state, to a selected one of the ON-state and the OFF-state, the initial-state-of-secondary-source setting means further comprises:

an electrically erasable programmable read only memory (EEPROM) for storing the desired initial state of the ON/OFF switching circuit;

an EEPROM initializing switch for selectively setting the desired initial state stored in the electrically erasable programmable read only memory to the OFF-state; and a second operation switch for setting said desired initial state stored in the electrically erasable programmable read only memory.

* * * * *